(12) United States Patent
Kim

(10) Patent No.: US 11,034,381 B2
(45) Date of Patent: Jun. 15, 2021

(54) APPARATUS AND METHOD OF CONTROLLING MOTOR-DRIVEN POWER STEERING SYSTEM

(71) Applicant: HYUNDAI MOBIS Co., Ltd., Seoul (KR)

(72) Inventor: Tae Hong Kim, Seongnam-si (KR)

(73) Assignee: HYUNDAI MOBIS Co., Ltd.

( * ) Notice: Subject to any disclaimer, the term of this patent is extended or adjusted under 35 U.S.C. 154(b) by 275 days.

(21) Appl. No.: 16/208,399

(22) Filed: Dec. 3, 2018

(65) Prior Publication Data

US 2019/0176875 A1 Jun. 13, 2019

(30) Foreign Application Priority Data

Dec. 7, 2017 (KR) .................. 10-2017-0167328

(51) Int. Cl.
| | | |
|---|---|---|
| *B62D 5/04* | (2006.01) | |
| *B62D 6/00* | (2006.01) | |
| *B62D 6/02* | (2006.01) | |
| *B62D 6/08* | (2006.01) | |

(52) U.S. Cl.
CPC ......... *B62D 5/0463* (2013.01); *B62D 5/0466* (2013.01); *B62D 6/02* (2013.01); *B62D 6/08* (2013.01)

(58) Field of Classification Search
None
See application file for complete search history.

(56) References Cited

U.S. PATENT DOCUMENTS

| | | | | |
|---|---|---|---|---|
| 10,562,566 | B2 * | 2/2020 | Kim .................... | B62D 5/0466 |
| 2008/0167780 | A1 * | 7/2008 | Suzuki ................ | B62D 5/0466 |
| | | | | 701/42 |
| 2015/0225014 | A1 * | 8/2015 | Takeda ................ | B62D 15/025 |
| | | | | 701/41 |
| 2016/0251028 | A1 * | 9/2016 | Tsubaki ............... | B62D 5/046 |
| | | | | 701/42 |
| 2017/0106898 | A1 * | 4/2017 | Sakaguchi ........... | B62D 6/04 |
| 2017/0137057 | A1 * | 5/2017 | Kitazume ............ | B62D 5/0463 |

(Continued)

FOREIGN PATENT DOCUMENTS

| | | |
|---|---|---|
| JP | 2002-104220 | 4/2002 |
| JP | 2002-362394 | 12/2002 |
| KR | 10-2015-0136885 | 12/2015 |

*Primary Examiner* — Abdhesh K Jha
(74) *Attorney, Agent, or Firm* — H.C. Park & Associates, PLC

(57) ABSTRACT

Disclosed herein are an apparatus and method of controlling a motor-driven power steering system. The apparatus may include: a sensor configured to detect at least one of a steering angle, an angular speed, and a column torque in the motor-driven power steering system; and a controller configured to determine whether a reverse steering operation has been performed based on the steering angle or the angular speed, and configured to output, when non-reverse steering, a high-frequency compensation gain (a second gain) based on the column torque, as a final compensation gain, and output, when reverse steering, a value obtained by applying an additional compensation gain (a first gain) optimized corresponding to an angular acceleration to the high-frequency compensation gain (the second gain), as the final compensation gain.

8 Claims, 2 Drawing Sheets

(56) References Cited

U.S. PATENT DOCUMENTS

| | | | |
|---|---|---|---|
| 2017/0203782 A1* | 7/2017 | Yamanaka | B62D 5/04 |
| 2017/0274928 A1* | 9/2017 | Minaki | B62D 5/04 |
| 2017/0349208 A1* | 12/2017 | Sugawara | B62D 5/0472 |
| 2018/0194389 A1* | 7/2018 | Imamura | B62D 5/0469 |
| 2018/0201306 A1* | 7/2018 | Tsubaki | B62D 15/025 |
| 2018/0304919 A1* | 10/2018 | Jung | B62D 6/00 |
| 2019/0270482 A1* | 9/2019 | Nakakuki | B62D 5/0409 |
| 2019/0329817 A1* | 10/2019 | Takase | H02M 7/5395 |
| 2020/0339184 A1* | 10/2020 | Matsuo | B62D 5/0424 |

\* cited by examiner

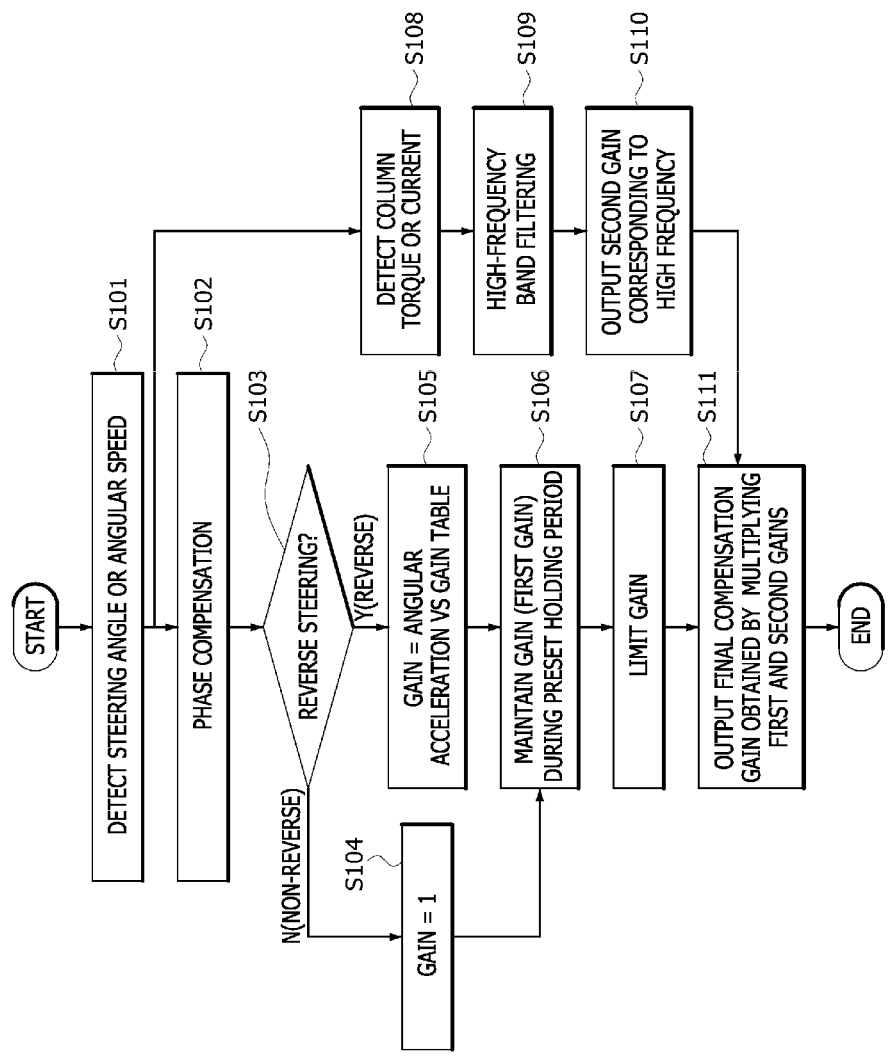

APPARATUS AND METHOD OF CONTROLLING MOTOR-DRIVEN POWER STEERING SYSTEM

CROSS-REFERENCES TO RELATED APPLICATION

This application claims priority from and the benefit of Korean Patent Application No. 10-2017-0167328, filed on Dec. 7, 2017, which is hereby incorporated by reference for all purposes as if set forth herein.

BACKGROUND

Field

Exemplary embodiments relate to an apparatus and method of controlling a motor-driven power steering (MDPS) system, and more particularly, to an apparatus and method of controlling an MDPS system capable of instantaneously enhancing responsiveness when reverse steering in the MDPS system, thus mitigating steering unfamiliarity such as sticky or stuck feel.

Discussion of the Background

In general, recent vehicles employ motor-driven power steering (MDPS) systems. Such an MDPS system is a system which enables a steering wheel to be easily rotated using the operation of a motor rather than using the flow of oil by the operation of an engine. The MDPS system reduces the load of the engine and thus is highly effective in enhancing the fuel efficiency of the engine.

Compared to existing hydraulic power steering systems, the MDPS system is light, takes less space, and does not need oil change. In addition, the MDPS system employs an auxiliary power source to provide some of steering torque required to be applied to the steering wheel when the driver steers the steering wheel, thus facilitating the steering operation. In other words, a torque sensor directly coupled to the steering wheel senses a steering intention of the driver, and the MDPS system receives a corresponding signal from the torque sensor, and drives a motor to provide appropriate force taking into account a current speed of the vehicle, thus assisting in force required for steering.

The conventional MDPS system proposes a method of improving steering feel by controlling a width of hysteresis, which occurs depending on a change in gain when reverse steering, by compensating for column torque. However, this method is problematic in that steering unfamiliarity such as sticky or stuck feel may not be mitigated.

The related art of the present invention is disclosed in Korean Patent Unexamined Publication No. 10-2015-0136885, published on Dec. 8, 2015, and entitled "Apparatus and method of compensating for column torque in MDPS system".

The above information disclosed in this Background section is only for enhancement of understanding of the background of the invention and, therefore, it may contain information that does not constitute prior art.

SUMMARY

Exemplary embodiments of the present invention are directed to an apparatus and method of controlling a motor-driven power steering system capable of instantaneously enhancing responsiveness when reverse steering in the MDPS system, thus mitigating steering unfamiliarity such as sticky or stuck feel.

In one embodiment, an apparatus of controlling a motor-driven power steering system, may include: a sensor configured to detect at least one of a steering angle, an angular speed, and a column torque in the motor-driven power steering system; and a controller configured to determine whether a reverse steering operation has been performed based on the steering angle or the angular speed, and configured to output, when non-reverse steering, a high-frequency compensation gain (a second gain) based on the column torque, as a final compensation gain, and output, when reverse steering, a value obtained by applying an additional compensation gain (a first gain) optimized corresponding to an angular acceleration to the high-frequency compensation gain (the second gain), as the final compensation gain.

The controller may include a phase compensator configured to remove, through an operation of compensating for a phase of a signal pertaining to the steering angle or the angular speed, a noise included in the signal, or perform a phase shift operation to optimize a compensation timing.

The controller may further include a reverse steering determination processor configured to encode the phase-compensated signal, and determine whether the reverse steering operation has been performed depending on whether a code of the phase-compensated signal has been changed from a negative number to a positive number or from a positive number to a negative number.

The controller may include a gain selector configured to: output, when reverse steering, a gain corresponding to the angular acceleration among gain values stored in a compensation gain table, a compensation gain value; and output, when non-reverse steering, "1" as the compensation gain value.

The controller may further include a compensation gain holder configured to maintain, if the gain value (the first gain) corresponding to the angular acceleration is selected and outputted as the compensation gain value when reverse steering, the output of the compensation gain during a gain holding period corresponding to the angular acceleration stored in advance in a compensation gain holding period table.

The controller may further include a compensation gain limiter configured to limit, when reverse steering, the outputted compensation gain value (the first gain) so that the compensation gain value is stably maintained without exceeding a preset reference value.

The controller may further include a multiplication unit configured to detect, when reverse steering, a column torque signal or a motor current through a high-frequency filter, extract a high-frequency component therefrom, and then output, as the final compensation gain, a value obtained by multiplying the compensation gain (the second gain) outputted corresponding to the high-frequency component by the additional compensation gain (the first gain) optimized corresponding to the angular acceleration.

In another embodiment, a method of controlling a motor-driven power steering system may include: detecting at least one of a steering angle, an angular speed, and a column torque using at least one or more sensors installed in the motor-driven power steering system; and determining, by a controller, whether a reverse steering operation has been performed based on the steering angle or the angular speed, and outputting, when non-reverse steering, a high-frequency compensation gain (a second gain) based on the column torque, as a final compensation gain, and outputting, when reverse steering, a value obtained by applying an additional compensation gain (a first gain) optimized corresponding to an angular acceleration to the high-frequency compensation gain (the second gain), as the final compensation gain.

In the outputting as the final compensation gain, the controller may remove, through an operation of compensating for a phase of a signal pertaining to the steering angle or the angular speed, a noise included in the signal, or perform a phase shift operation to optimize a compensation timing.

In the outputting as the final compensation gain, the controller may encode the phase-compensated signal, and determine whether the reverse steering operation has been performed depending on whether a code of the phase-compensated signal has been changed from a negative number to a positive number or from a positive number to a negative number.

In the outputting as the final compensation gain, the controller may output, when reverse steering, a gain corresponding to the angular acceleration among gain values stored in advance in a compensation gain table, and output, when non-reverse steering, "1" as the compensation gain value.

In the outputting as the final compensation gain, the controller may maintain, if the gain value (the first gain) corresponding to the angular acceleration is selected and outputted as the compensation gain value when reverse steering, the output of the compensation gain during a gain holding period corresponding to the angular acceleration stored in advance in a compensation gain holding period table.

In the outputting as the final compensation gain, the controller may limit, when reverse steering, the outputted compensation gain value (the first gain) so that the compensation gain value is stably maintained without exceeding a preset reference value.

In the outputting as the final compensation gain, the controller may detect, when reverse steering, a column torque signal or a motor current through a high-frequency filter, extract a high-frequency component therefrom, and then output, as the final compensation gain, a value obtained by multiplying the compensation gain (the second gain) outputted corresponding to the high-frequency component by the additional compensation gain (the first gain) optimized corresponding to the angular acceleration.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principle of the invention.

FIG. 2 is a flowchart for describing a method of controlling the MDPS system in accordance with an embodiment of the present invention.

DETAILED DESCRIPTION OF THE ILLUSTRATED EMBODIMENTS

Figure 1:
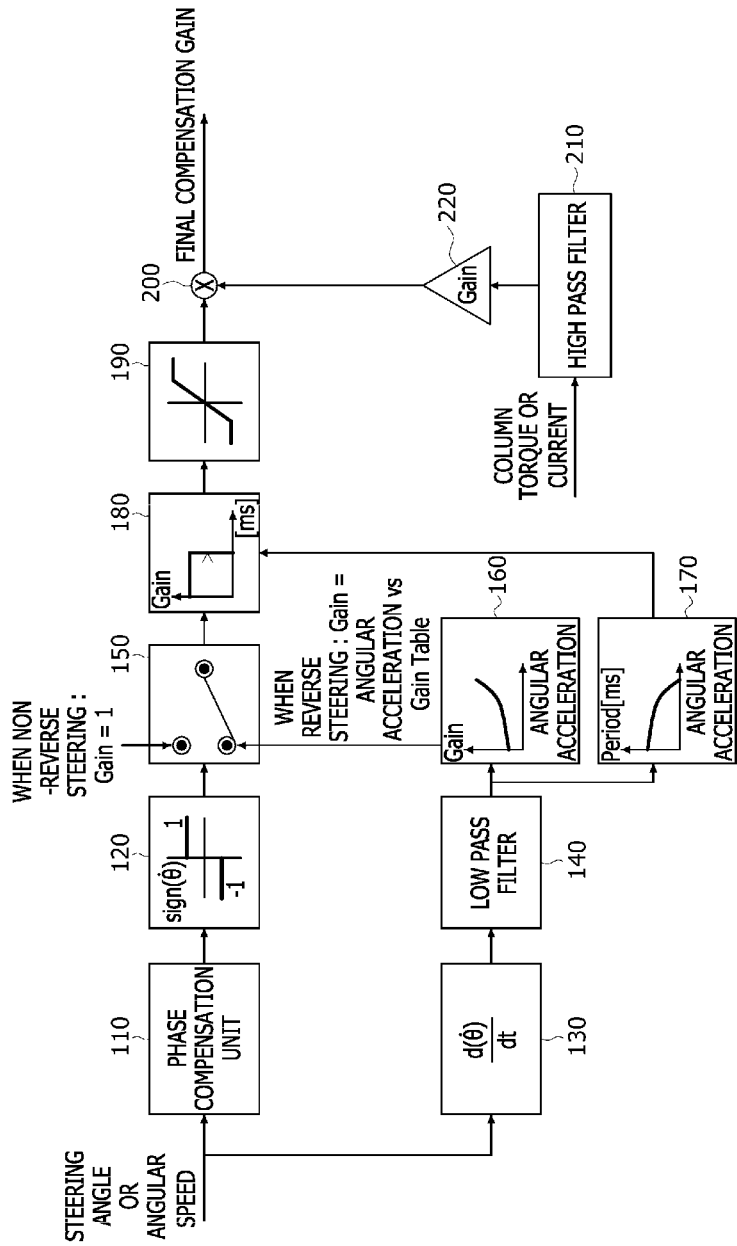
FIG. 1 is a diagram illustrating a schematic configuration of an apparatus for controlling a motor-driven power steering (MDPS) system in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, embodiments of an apparatus and method of controlling a motor-driven power steering (MDPS) system in accordance with the present invention will be described with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a diagram illustrating a schematic configuration of an apparatus for controlling an MDPS system in accordance with an embodiment of the present invention.

As shown in FIG. 1, the apparatus for controlling the MDPS system in accordance with the present embodiment includes a phase compensator 110, a reverse steering determination processor 120, an angular acceleration calculator 130, a low-frequency filter 140, a gain selector 150, a compensation gain table 160, a compensation gain holding period table 170, a compensation gain holder 180, a compensation gain limiter 190, a multiplication unit 200, a high-frequency filter 210, and a gain output unit 220.

In the present embodiment, a controller (e.g., an electric control unit (ECU), not shown) of the apparatus for controlling the MDPS system may sense a column torque and at least one of a steering angle and a motor's angular speed, using at least one or more sensors (e.g., at least one of a steering angle sensor, an angular speed sensor, a column torque sensor, etc., not shown).

The controller (not shown) may measure a column torque and at least one of a steering angle and an angular speed (or a motor's angular speed) using at least one or more sensors (not shown).

For reference, the term "steering angle" refers to an angle by which a steering wheel is steered by a driver, and the term "angular speed" refers to a speed at which the steering wheel rotates. Furthermore, the steering angle may be represented with a positive number (e.g., "1") when the steering wheel rotates from a center position in a clockwise direction, and may be represented with a negative number (e.g., "−1") when the steering wheel rotates from the center position in a counterclockwise direction. In addition, the angular speed (or the motor's angular speed) may be represented with a positive number (e.g., "1") when the steering wheel rotates in the clockwise direction, and may be represented with a negative number (e.g., "−1") when the steering wheel rotates in the counterclockwise direction.

The reverse steering determination processor 120 may determine whether reverse steering has been generated, based on at least one of a steering angle and an angular speed (or a motor's angular speed) detected by the at least one or more sensors (not shown).

Here, the term "reverse steering" means that the steering direction is changed from one direction (e.g., to the right) to an opposite direction (e.g., to the left).

In other words, to determine whether the reverse steering has been generated, the reverse steering determination processor 120 may encode the steering angle or the angular speed (or the motor's angular speed) and monitor in real time changes in code. When the steering angle or the angular speed (or the motor's angular speed) is changed from "−1" to "+1" or from "+1" to "−1", it is determined that the reverse steering has been generated.

Here, the phase compensator 110 may compensate for the phase of a steering angle or angular speed signal detected by the at least one or more sensors (not shown). In other words, the phase compensator 110 may remove a noise included in the sensor signal, or perform a phase shift operation to optimize a compensation timing.

The reverse steering determination processor 120 may process a phase signal that is outputted after having been compensated for by the phase compensator 110, and determine whether reverse steering has been generated, based on whether the signal has been changed from a negative number (or a positive number) to a positive number (or a negative number).

The angular acceleration calculator 130 may calculate an angular acceleration by differentiating the angular speed (or the motor's angular speed). However, in the case where the angular speed (or the motor's angular speed) is differentiated to calculate the angular acceleration, a lot of noises may be included.

Given this, the low-frequency filter 140 may remove the noises included in the angular acceleration before outputting it.

The compensation gain table 160 may store in advance gains corresponding to the angular acceleration. The compensation gain holding period table 170 may store in advance gain holding periods corresponding to the angular acceleration.

The gain table corresponding to the angular acceleration and the gain holding period table corresponding to the angular acceleration may store in advance optimal values obtained by experiments (or tuning) or calculation.

The gain selector 150 may select and output any one preset gain (e.g., a gain corresponding to non-reverse steering, or a gain corresponding to reverse steering) depending on a result of the operation of determining, by the reverse steering determination processor 120, whether the reverse steering has been generated.

For example, if it is determined to be in a non-reverse steering state as a result of the reverse steering determination operation of the reverse steering determination processor 120, the gain selector 150 outputs "1" as a gain value. If it is determined to be in a reverse steering state, the gain selector 150 selects a gain value corresponding to the angular acceleration among the gain values stored in the compensation gain table 160, and outputs the selected gain value.

In other words, if the driver performs a reverse steering operation, the code of the steering angle or the angular speed (or the motor's angular speed) may be changed. In this case, an appropriate compensation gain (e.g., a first gain) is outputted from the compensation gain table 160 based on the steering angle or the angular acceleration (or the motor's angular acceleration). On the other hand, if the driver does not perform a reverse steering operation, in other words, if the code of the steering angle or the angular speed (or the motor's angular speed) is not changed, the compensation gain remains "1".

Here, since the gain values corresponding to angular accelerations are stored in advance in the compensation gain table 160, the gain selector 150 may directly select a gain value corresponding to an associated angular acceleration at the same time as the reverse steering determination. In other words, when reverse steering, the gain responsiveness may be instantaneously increased.

As such, when reverse steering, if the gain value (e.g., the first gain value) corresponding to the reverse steering is outputted through the gain selector 150, the compensation gain holder 180 maintains the gain value (e.g., the first gain value) outputted through the gain selector 150 during a gain holding period corresponding to the angular acceleration among the gain holding periods which are stored in advance in the compensation gain holding period table 170.

For example, in the case where a reverse steering operation has been performed, an appropriate compensation gain is outputted. Although a compensation gain is outputted only when the steering is reversed, a compensation output is required to be maintained for a predetermined time so that, when the driver actually performs a reverse steering operation, the system may provide appropriate feedback while maintaining instantaneous rapid responsiveness.

Therefore, in the present embodiment, the compensation output is maintained for a predetermined time after the reverse steering operation has been performed, rather than outputting a compensation gain only at a timing at which the reverse steering is generated. Thereby, the system maintains the compensation output until the steering is reversed to an appropriate position corresponding to the intention of the driver. Here, an optimum value tuned in advance through a holding period tuning map (i.e., the compensation gain holding period table 170) in response to the steering angle or the angular speed (or the motor's angular speed) is used.

The compensation gain limiter 190 may limit the gain value (e.g., the first gain value) outputted from the compensation gain holder 180 so that the gain value can be stably maintained without exceeding a preset reference value.

The high-frequency filter 210 may detect a high-frequency component of a column torque signal when reverse steering, and output it. Here, a compensation gain (e.g., a second gain) 220 corresponding to the high-frequency component may be applied and outputted.

For reference, in a control operation of the MDPS system, to provide rapid responsiveness when steering, the high-frequency filter 210 extracts a high-frequency component from a column torque inputted to a motor-driven steering apparatus during the steering operation of the driver, and a value obtained by multiplying the high-frequency component by an appropriate gain may be applied to a logic output of the motor-driven steering apparatus. However, during a general steering operation, in the case where the compensation gain corresponding to the extracted high-frequency component is excessively large, side effects may occur as follows: loose and artificial steering feel may be caused; and system control stability may be reduced, whereby vibrations may be generated.

Therefore, during a general steering operation (i.e., when non-reverse steering), a basic high-frequency extraction compensation gain (e.g., a second gain) is used. Only when reverse steering, an optimized additional compensation gain (e.g., a first gain) is used as needed, as shown in the present embodiment, so that instantaneous responsiveness may be increased, whereby unfamiliarity in steering may be mitigated, and the stability of the system may be enhanced.

The multiplication unit 200 may output, when reverse steering, a final compensation gain obtained by multiplying the compensation gain value (e.g., the first gain) that is selected by the gain selector 150 and then outputted through the compensation gain limiter 190, by the compensation gain (e.g., the second gain) corresponding to the high-frequency component extracted through the high-frequency filter 210.

In the present embodiment, for the sake of explanation, the operations of the components 110 to 200 have been described as being separately performed, but they may be integrally embodied by the controller (e.g., the ECU, not shown). Accordingly, it should be noted that the controller (not shown) may integrally perform the operations of the components 110 to 200.

Hereinafter, with reference to FIG. 2, a description will be made to the case where the controller (not shown) integrally performs the operations of the components 110 to 200.

FIG. 2 is a flowchart for describing a method of controlling the motor-driven power steering system in accordance with an embodiment of the present invention.

As shown in FIG. 2, the controller (not shown) detects a steering angle or an angular speed (or a motor's angular speed) using at least one or more sensors (e.g., the steering angle sensor, the angular speed sensor, the column torque sensor, etc., not shown) installed in the MDPS system, at step S101.

Furthermore, the controller (not shown) may perform an operation of compensating for the phase of the steering angle signal or the angular speed (or the motor's angular speed) signal, at step S102, so as to remove a noise included in the signal, or may perform a phase shift operation to optimize a compensation timing.

The controller (not shown) encodes the phase-compensated signal (e.g., the steering angle or angular speed signal), and determines whether a reverse steering operation has been performed depending on whether the code of the signal has been changed from a negative number (or a positive number) to a positive number (or a negative number), at step S103.

When it is determined that the reverse steering operation has been performed as a result of the determination (at step S103), the controller (not shown) outputs a gain corresponding to an angular acceleration among the gains stored in the compensation gain table 160 as a compensation gain value, at step S105. When it is determined to be in a non-reverse steering state, in other words, when it is determined that the code of the steering angle or the angular speed (or, the motor's angular speed) has not been changed, the compensation gain remains "1", at step S104.

As such, if the gain value (e.g., the first gain value) corresponding to the angular speed is selected and outputted in response to the reverse steering, the controller (not shown) maintains the output of the gain value (e.g., the first gain value) during a gain holding period corresponding to the angular acceleration among the gain holding periods that are stored in advance in the compensation gain holding period table 170, at step S106.

The reason for this is because the compensation output is required to be maintained for a predetermined time so that, when the driver actually performs a reverse steering operation, the system may provide appropriate feedback while maintaining instantaneous rapid responsiveness. Therefore, in the present embodiment, the compensation output is maintained for a predetermined time after the reverse steering operation has been performed, rather than outputting a compensation gain only at a timing at which the reverse steering is generated. Thereby, the system maintains the compensation output until the steering is reversed to an appropriate position corresponding to the intention of the driver.

The compensation gain table 160 may store in advance gains corresponding to the angular acceleration. The compensation gain retaining period table 170 may store in advance gain retaining periods corresponding to the angular acceleration.

Furthermore, the controller (not shown) limits the compensation gain (e.g., the first gain value) outputted when reverse steering so that the compensation gain can be stably maintained without exceeding a preset reference value, at step S107.

On the one hand, when reverse steering, a column torque signal (or a motor current) is detected by the high-frequency filter 210, at step S108, and a high-frequency component is extracted from the column torque signal, at step S109. A compensation gain (e.g., a second gain) corresponding to the high-frequency component is outputted, at step S110.

Furthermore, the controller (not shown) outputs a final compensation gain obtained by multiplying the compensation gain value (e.g., the first gain) by the compensation gain (e.g., the second gain) corresponding to the high-frequency component extracted through the high-frequency filter 210, at step S111.

Therefore, in the present embodiment, during a general steering operation (i.e., when non-reverse steering), a basic high-frequency extraction compensation gain (e.g., a second gain) is maintained. When reverse steering, the additional compensation gain (e.g., a first gain) optimized corresponding to the angular acceleration is used. Thereby, instantaneous responsiveness may be increased to mitigate unfamiliarity in steering and enhance the stability of the system.

Embodiments of the present invention may provide an apparatus and method of controlling a motor-driven power steering system capable of instantaneously enhancing responsiveness when reverse steering in the MDPS system, thus mitigating steering unfamiliarity such as sticky or stuck feel.

While the present invention has been described with respect to the specific embodiments illustrated in the attached drawings, these are only for illustrative purposes, and it will be apparent to those skilled in the art that various changes and modifications may be made without departing from the spirit and scope of the invention as defined in the following claims. Therefore, the spirit and scope of the present invention must be defined by the accompanying claims.

What is claimed is:

1. An apparatus for controlling a motor-driven power steering system, comprising:
   a sensor configured to detect at least one of a steering angle, an angular speed, and a column torque in the motor-driven power steering system; and
   a controller configured to determine whether a reverse steering operation has been performed based on the steering angle or the angular speed, and configured to output, when non-reverse steering is performed, a high-frequency compensation gain based on the column torque, as a final compensation gain, and output, when reverse steering is performed, a value obtained by applying an additional compensation gain optimized according to an angular acceleration to the high-frequency compensation gain, as the final compensation gain, wherein the angular acceleration is generated by differentiating the angular speed, wherein the controller comprises a gain selector configured to:

output, when reverse steering is performed, a gain corresponding to the angular acceleration among gain values stored in a compensation gain table, a compensation gain value; and output, when non-reverse steering is performed, "1" as the compensation gain value, wherein the controller further comprises a compensation gain holder configured to maintain, if a gain value of the additional compensation gain corresponding to the angular acceleration is selected and outputted as a compensation gain value when reverse steering is performed, the output of the compensation gain during a gain holding period corresponding to the angular acceleration stored in advance in a compensation gain holding period table, and wherein the controller further comprises a compensation gain limiter configured to limit, when reverse steering is performed, the outputted compensation gain value of the additional compensation gain so that the compensation gain value is stably maintained without exceeding a preset reference value.

2. The apparatus of claim 1, wherein the controller comprises a phase compensator configured to generate a phase-compensated signal by removing a noise included in a signal of the steering angle or the angular speed, or by performing a phase shift operation to optimize a compensation timing.

3. The apparatus of claim 2, wherein the controller further comprises a reverse steering determination processor configured to encode the phase-compensated signal, and determine whether the reverse steering operation has been performed depending on whether a code of the phase-compensated signal has been changed from a negative number to a positive number or from a positive number to a negative number.

4. The apparatus of claim 1, wherein the controller further comprises a multiplier configured to detect, when reverse steering is performed, a column torque signal or a motor current through a high-frequency filter, extract a high-frequency component therefrom, and then output, as the final compensation gain, a value obtained by multiplying the high-frequency compensation gain outputted corresponding to the high-frequency component by the additional compensation gain optimized according-to the angular acceleration.

5. A method of controlling a motor-driven power steering system, comprising the steps of:

detecting at least one of a steering angle, an angular speed, and a column torque using at least one or more sensors installed in the motor-driven power steering system; and determining, by a controller, whether a reverse steering operation has been performed based on the steering angle or the angular speed, and outputting, when non-reverse steering is performed, a high-frequency compensation gain based on the column torque, as a final compensation gain, and outputting, when reverse steering is performed, a value obtained by applying an additional compensation gain optimized according to an angular acceleration to the high-frequency compensation gain, as the final compensation gain, wherein the angular acceleration is generated by differentiating the angular speed, wherein, in the step of outputting as the final compensation gain, the controller is configured to output, when reverse steering is performed, a gain corresponding to the angular acceleration among gain values stored in advance in a compensation gain table, and outputs, when non-reverse steering is performed, "1" as the compensation gain value, wherein, in the step of outputting as the final compensation gain, the controller is configured to maintain, if the gain value of the additional compensation gain corresponding to the angular acceleration is selected and outputted as the compensation gain value when reverse steering, the output of the compensation gain during a gain holding period corresponding to the angular acceleration stored in advance in a compensation gain holding period table, and wherein, in the step of outputting as the final compensation gain, the controller is configured to limit, when reverse steering, the outputted compensation gain value so that the compensation gain value is stably maintained without exceeding a preset reference value.

6. The method of claim 5, wherein, in the step of outputting as the final compensation gain, the controller is configured to generate a phase-compensated signal by removing a noise included in a signal of the steering angle or the angular speed, or by performing a phase shift operation to optimize a compensation timing.

7. The method of claim 6, wherein, in the step of outputting as the final compensation gain, the controller encodes the phase-compensated signal, and determines whether the reverse steering operation has been performed depending on whether a code of the phase-compensated signal has been changed from a negative number to a positive number or from a positive number to a negative number.

8. The method of claim 5, wherein, in the step of outputting as the final compensation gain, the controller is configured to detect, when reverse steering is performed, a column torque signal or a motor current through a high-frequency filter, extracts a high-frequency component therefrom, and then outputs, as the final compensation gain, a value obtained by multiplying the compensation gain outputted corresponding to the high-frequency component by the additional compensation gain optimized according to the angular acceleration.

* * * * *